United States Patent
Sayre et al.

(10) Patent No.: US 9,810,302 B2
(45) Date of Patent: Nov. 7, 2017

(54) TORQUE CONVERTER CLUTCH WITH REDUCED BACK PRESSURE

(71) Applicant: Schaeffler Technologies AG & Co. KG, Herzogenaurach (DE)

(72) Inventors: Daniel Sayre, Copley, OH (US); Matthew Smith, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 5 days.

(21) Appl. No.: 14/751,219

(22) Filed: Jun. 26, 2015

(65) Prior Publication Data

US 2016/0017971 A1 Jan. 21, 2016

Related U.S. Application Data

(60) Provisional application No. 62/025,143, filed on Jul. 16, 2014.

(51) Int. Cl.
*F16H 45/02* (2006.01)

(52) U.S. Cl.
CPC ....... *F16H 45/02* (2013.01); *F16H 2045/021* (2013.01); *F16H 2045/0221* (2013.01); *F16H 2045/0294* (2013.01)

(58) Field of Classification Search
CPC ............. F16H 45/02; F16H 2045/0221; F16H 2045/0294
See application file for complete search history.

(56) References Cited

U.S. PATENT DOCUMENTS

| 5,699,887 | A | 12/1997 | Kundermann |
| 8,967,349 | B2 * | 3/2015 | Ushio ............ F16H 45/02 192/3.29 |
| 9,188,212 | B2 * | 11/2015 | Vanni ............ F16H 45/02 |
| 9,217,498 | B2 * | 12/2015 | Sturgin ........ F16D 25/0638 |
| 9,309,956 | B2 * | 4/2016 | Lindemann ...... F16H 45/02 |

(Continued)

FOREIGN PATENT DOCUMENTS

| JP | 2013072552 A1 | 4/2013 |
| JP | 2013217452 A | 10/2013 |

OTHER PUBLICATIONS

International Search Report and Opinion for PCT/US2015/037864; 12 pages; dated Sep. 8, 2015 by Korean Intellectual Property Office.

*Primary Examiner* — Jacob S Scott
*Assistant Examiner* — Tinh Dang
(74) *Attorney, Agent, or Firm* — LeKeisha M. Suggs; Kevin L. Parks

(57) ABSTRACT

A torque converter comprising: an axis of rotation; a first seal at a first radial distance relative to the axis of rotation; a second seal at a second radial distance relative to the axis of rotation; an impeller shell and a balancing plate defining at least a portion of a first hydraulic chamber; a piston plate sealed via the first seal to the balancing plate defining at least a portion of a second hydraulic chamber; a cover sealed to the piston plate via the second seal defining at least a portion of a third hydraulic chamber. A clutch plate is radially outward relative to the balancing plate. The sealing arrangement, effective at preventing drift-on or drift-off of the clutch due to dynamic pressure, features a first radial distance that is the same or equal to the second radial distance.

19 Claims, 3 Drawing Sheets

(56) References Cited

U.S. PATENT DOCUMENTS

2009/0127050 A1* 5/2009 Ari .................. F16H 45/02
                                                192/3.29
2011/0132709 A1   6/2011 Fukunaga et al.
2013/0056319 A1   3/2013 Lindemann et al.

* cited by examiner

TORQUE CONVERTER CLUTCH WITH REDUCED BACK PRESSURE

FIELD

The invention relates generally to a torque converter clutch including a cancelation chamber having a sealing arrangement effective at preventing drift-on or drift-off of the clutch due to dynamic pressure.

BACKGROUND

U.S. Patent Publication No. 2013/0056319, hereby incorporated by reference herein, discloses a torque converter clutch having three chambers wherein the third chamber is for being de-pressurized to reduce a back pressure on the lockup clutch piston plate.

BRIEF SUMMARY

Example aspects broadly comprise a torque converter comprising: an axis of rotation; a first seal at a first radial distance relative to the axis of rotation; a second seal at a second radial distance relative to the axis of rotation; an impeller shell and a balancing plate defining at least a portion of a first hydraulic chamber; a piston plate sealed via the first seal to the balancing plate defining at least a portion of a second hydraulic chamber; a cover sealed to the piston plate via the second seal defining at least a portion of a third hydraulic chamber. In an example aspect, the first radial distance is same or equal to the second radial distance.

In an example aspect, the third hydraulic chamber is sealed from the first and second hydraulic chambers. In an example aspect, the third hydraulic chamber is arranged to balance the pressure from the second hydraulic chamber. In an example aspect, the piston plate has an inner surface, an outer surface, and an inner circumferential surface. In an example aspect, the piston plate inner surface is sealed via the first seal to the balancing plate and the piston plate outer surface is sealed via the second seal to the cover.

In an example aspect, the torque converter further comprises: a cover hub, including a pedestal having an outer circumferential surface and a groove disposed therein, fixed to the cover and the balancing plate; and, a third seal at a third radial distance relative to the axis of rotation. In an example aspect, the piston plate inner circumferential surface is sealed via the third seal, disposed in the groove, to the cover hub outer circumferential surface. In an example aspect, the third radial distance is less than the first and second radial distances.

In an example aspect, the torque converter further comprises a thrust washer including a thrust surface, wherein the third seal is radially outward relative to the thrust surface. In an example aspect, the balancing plate is connected in a circumferential direction via at least one leaf spring and at least one rivet to the piston plate.

In an example aspect, the torque converter further comprises an impeller; a turbine and a stator disposed within the first hydraulic chamber, and, a lockup clutch including the piston plate, wherein: the first hydraulic chamber is for being pressurized to prevent cavitation of the turbine, stator, or impeller; the second hydraulic chamber is for being pressurized to engage the lockup clutch; the third hydraulic chamber is for being de-pressurized to reduce a back pressure on the lockup clutch piston plate. In an example aspect, the lockup clutch is positioned radially outward relative to the second and third hydraulic chambers.

Other example aspects broadly comprise a torque converter comprising: (i) a housing including an impeller shell and a cover; (ii) a first hub, fixed to the cover, comprising: a body; a pedestal positioned radially outward relative to the body and having an outer circumferential surface and a groove disposed therein; and, a first seal disposed in the groove; (iii) a torque converter clutch including: a piston plate rotationally sealed to the first hub via the first seal; and a clutch plate; (iv) a second seal for sealing the piston plate to a balancing plate; (v) a third seal for sealing the piston plate to the cover; (vi) the balancing plate rotationally fixed to the piston plate and fixed to the first hub; and; (vii) a turbine including a turbine shell fixed to a second hub arranged for sealing to a transmission input shaft.

In an example aspect, the torque converter further comprises an axis of rotation, wherein: the first seal is at a first radial distance relative to the axis of rotation; the second seal is at a second radial distance relative to the axis of rotation; the third seal is at a third radial distance relative to the axis of rotation; wherein the first radial distance is less than the second and third radial distances; and, wherein the second and third radial distances are same or equal.

In an example aspect, the clutch plate is radially outward relative to the balancing plate. In an example aspect, the torque converter further comprises a thrust washer including a thrust surface facing the balancing plate, wherein the first seal is radially outward relative to the thrust surface. In an example aspect, the torque converter further comprises a fourth seal and a fifth seal, wherein the second hub is sealed to the first hub via the fourth and fifth seals. In an example aspect, the torque converter further comprises a damper drivingly engaged with the turbine and including a spring retainer fixed to the turbine. In an example aspect, the balancing plate is connected in a circumferential direction via at least one leaf spring and at least one rivet to the piston plate.

Other example aspects broadly comprise a torque converter comprising: an axis of rotation; a first fluid pathway arranged for flowing hydraulic fluid from a transmission input shaft through a first bore in a first hub to an apply chamber; a second fluid pathway arranged for flowing hydraulic fluid from between the transmission input shaft and a second hub through a second bore in the first hub into a balancing chamber; a third fluid pathway arranged for flowing hydraulic fluid between a third hub and a stator shaft into a fluid coupling chamber; a fourth fluid pathway arranged for flowing hydraulic fluid between the second hub and the stator shaft into the fluid coupling chamber; a piston plate; a first seal at a first radial distance relative the axis of rotation for sealing the first hub to the piston plate; a second seal at a second radial distance relative the axis of rotation for sealing the piston plate to a balancing plate; a third seal at a third radial distance relative the axis of rotation for sealing the piston plate to the cover; the first radial distance is at most equal to the second and third radial distances, where the second and third radial distances are same or equal. In an example aspect, the torque converter further comprises a clutch plate, wherein the clutch plate is radially outward relative to the balancing plate, the apply chamber, and the balancing chamber.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

In an example aspect, clutch capacity in a torque converter clutch is improved by controlling the piston differential pressure. A significant factor contributing to variability in piston differential pressure derives from the dynamic pressure effect of the fluid at varying distances from the centerline axis, also referred to as the axis of rotation.

In an example aspect, a three chamber torque converter including torque converter clutch controls the piston differential pressure by providing piston seals for two of the chambers at the same radial distance from the axis of rotation. In an example aspect, the equidistant seals provide for a balancing effect between the dynamic cancelation chamber and the clutch apply chamber. In an example aspect, the piston employs an S-shaped configuration.

In an example aspect, the same effective area is provided for the dynamic cancelation chamber as for the clutch apply chamber. Optimization of the dynamic pressure cancelation chamber allows the dynamic effect to be reduced to at or near zero. In an example aspect, the cancelation chamber and the lockup chamber share a common outside diameter as well as a common inside diameter thus creating an equivalent active area for the differential pressures acting on both sides, an inner surface and an outer surface, of the piston plate.

Figure 1:
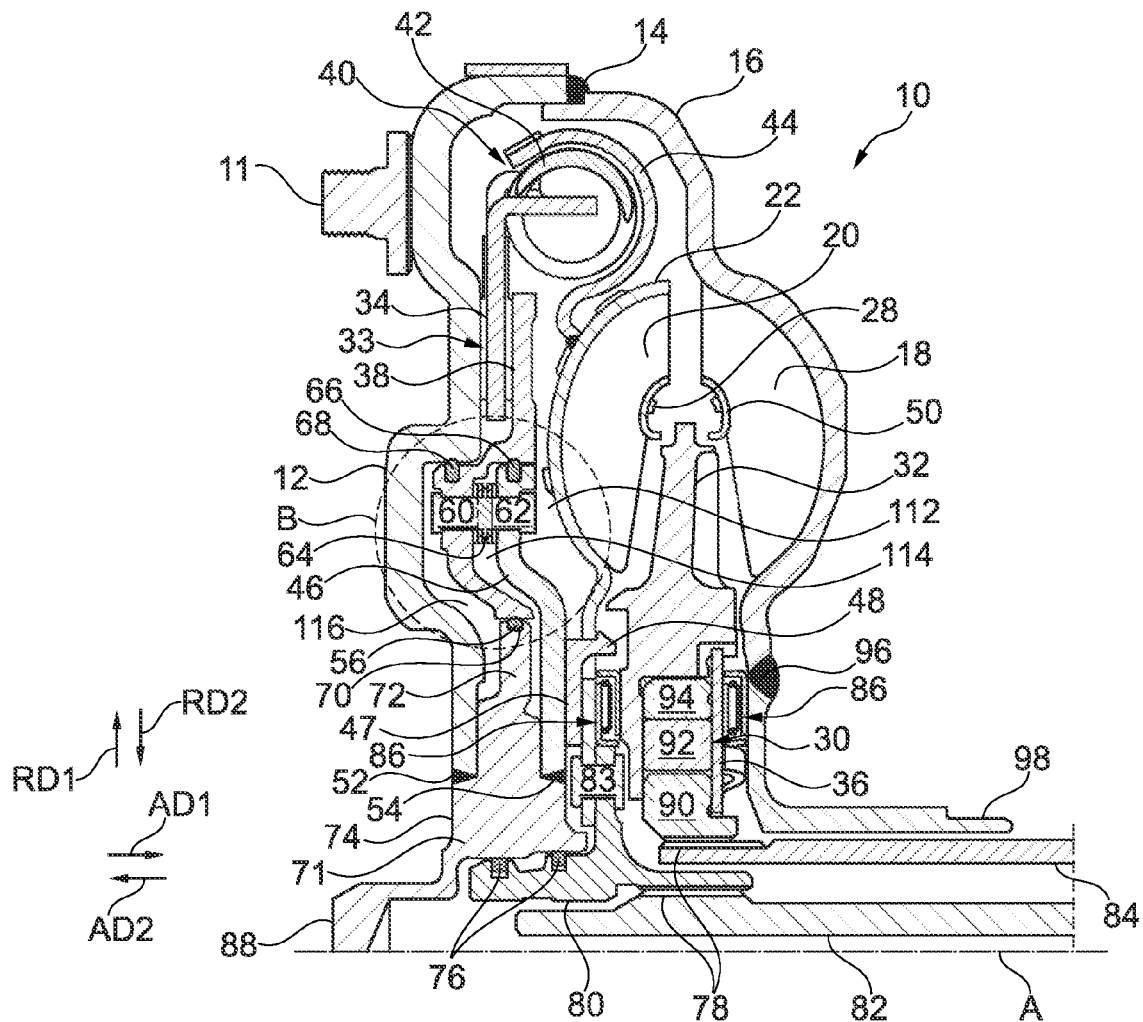
FIG. 1 illustrates partial cross-sectional view of a torque converter according to an example aspect.
Figure 2:
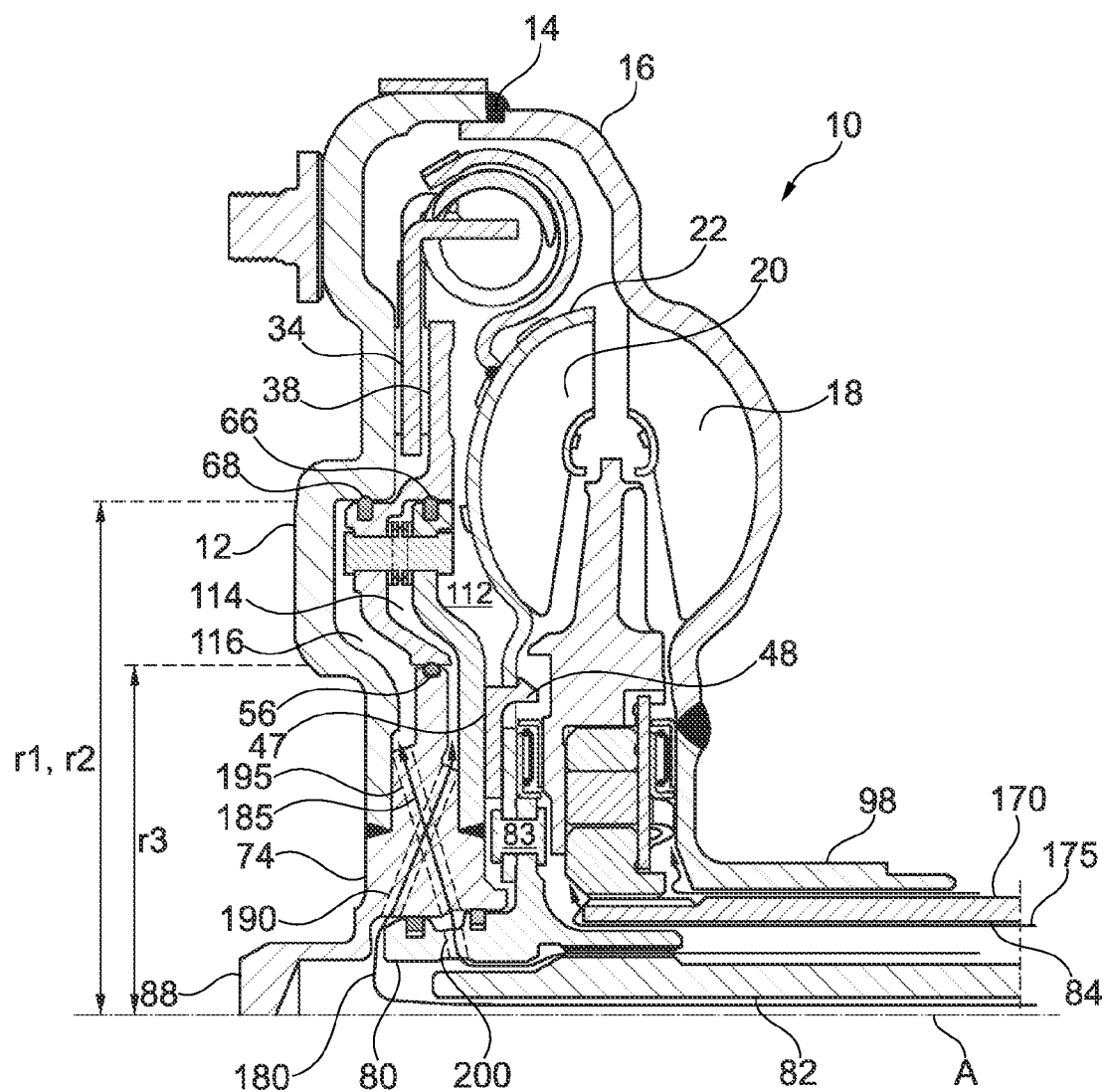
FIG. 2 illustrates the fluid pathways for the torque converter of FIG. 1 according to an example aspect.
Figure 3:
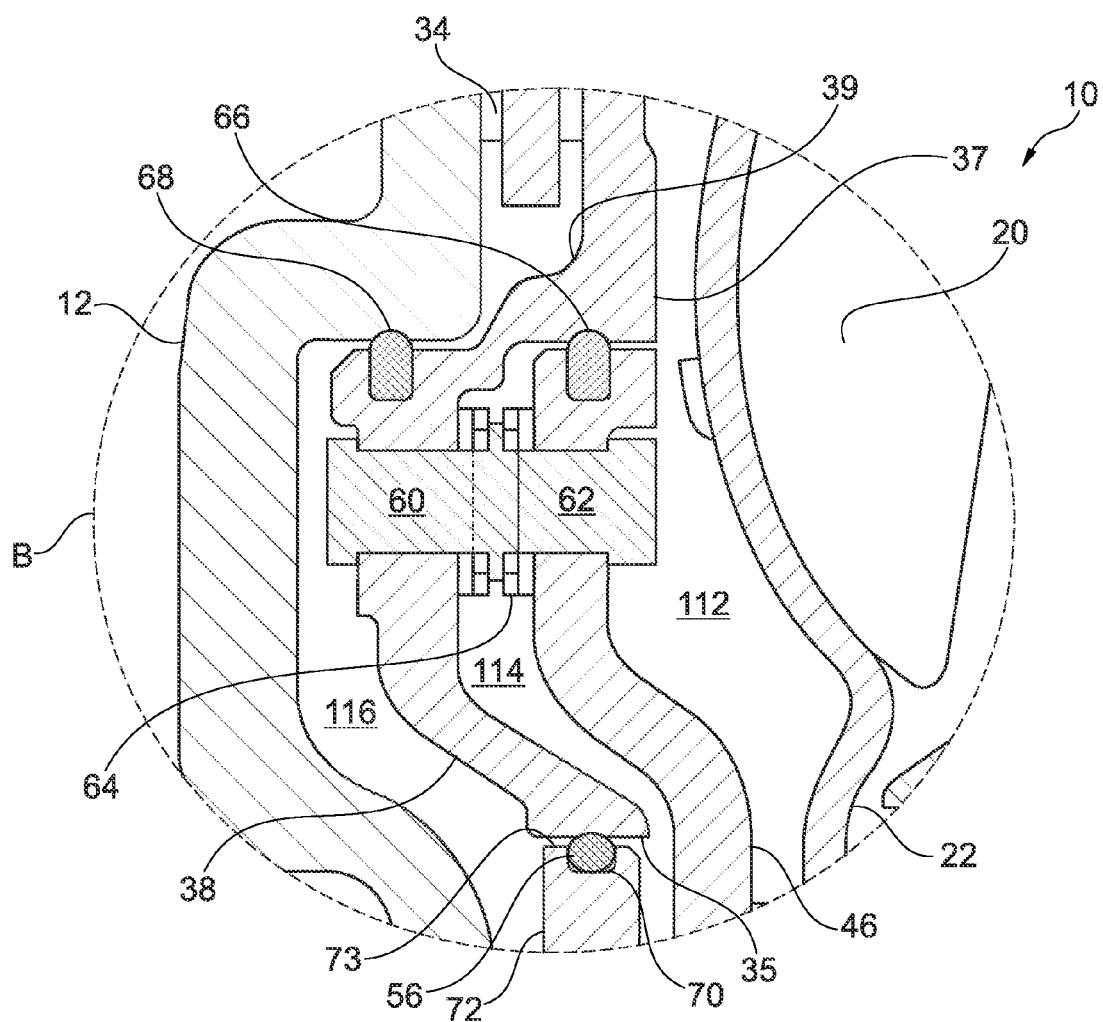
FIG. 3 illustrates a close-up view of the area in circle B of FIG. 1 for a torque converter according to an example aspect.

The following description is made with reference to FIGS. 1-3. FIG. 1 shows a partial cross section of torque converter 10 in an example aspect. Torque converter 10 includes front cover 12 for connecting to a crankshaft of an internal combustion engine via stud 11 and rear cover 16, also referred to as impeller shell interchangeably herein, for an impeller 18. Impellers are also referred to in the art interchangeably as 'pump'. Front cover 12 and rear cover 16 are fastened together via weld 14. Cover 12 is fixed or welded at weld 52 to cover hub 74 including body portion 71, pedestal 72, and cover pilot portion 88.

Torque converter 10 also includes turbine 20, turbine shell 22, and stator 32 situated between turbine 20 and impeller 18. Turbines and impellers, as is known in the art, include a plurality of blades. Turbine blades of turbine 20 have tabs 28 extending through slots in core ring 50. Blades are joined after assembly by bending, and fixed to core ring 50 by brazing or welding or by other methods known to those skilled in the art. Core ring 50 extends circumferentially about axis of rotation A, also referred to as simply axis A. Generally, first axial direction AD1 is opposite to second axial direction AD2; and, first radial direction RD1 is opposite to second radial direction RD2.

Referring again to FIG. 1, Torque converter 10 further includes one-way clutch 30, which supports stator 32, and includes inner race 90, roller 92, and outer race 94. Side plate 36 holds one-way clutch 30 in place within stator 32. Stator 32 includes a groove to accommodate side plate 36.

Torque converter 10 includes damper assembly 40, which is connected to and drivable by turbine 20, and is positioned between turbine 20 and front cover 12. Damper assembly 40 includes clutch plate 34, spring 42, and spring retainer 44 fixed to turbine shell 22. Clutch plate 34, which may also be referred to as lock up clutch interchangeably herein, optionally includes friction material on either or both sides positioned axially between cover 12 and piston plate 38. Clutch plate 34 and spring retainer 44 are positioned radially outward of balancing plate 46. Torque converter clutch 33 includes clutch plate 34 and piston plate 38, also sometimes referred to simply as clutch and piston, respectively.

Torque converter 10 includes hub 80, which is fixed to turbine shell 22, and is sealed to cover hub 74. Seals 76 at least partially seal hub 80 to cover hub 74. Thrust washer 48 is disposed between turbine shell 22 and balancing plate 46. Thrust surface 47 of thrust washer 48 faces balancing plate 46. Torque converter 10 includes bearings 86 including cages, weld 96, and hub 98. FIG. 1 also shows transmission components including splines 78, input shaft 82, and stator shaft 84. Hub 80 is splined to input shaft 82 and inner race 90 is splined to stator shaft 84 at splines 78.

In an example aspect, torque converter 10 is a four pass, three chamber torque converter. In other words, there are four fluid pathways available for fluid communication to the torque converter, and there are three separate chambers wherein flow is at least restricted between said chambers. As is known in the art, there are orifices (not shown) between chambers to allow for fluid release as necessary, however, the orifices are not to be considered fluid pathways.

In an example aspect, torque converter 10 comprises axis of rotation A with seals 66 and 68 at first and second radial distances, r1 and r2 respectfully, relative to axis A. In an example aspect, first and second radial distances r1 and r2 are the same or equal. In other words, seals 66 and 68 are radially outward (in radial direction RD1) relative to axis A to an radial equal distance. Seal 66 is positioned at radial distance r1 and seal 68 is positioned at radial distance r2. Radial distances r1 and r2 are equivalent distances, therefore r1 is equidistant with r2.

Impeller shell 16 and balancing plate 46 define at least a portion of first hydraulic chamber 112. Hydraulic chamber 112 is also referred to as fluid coupling chamber interchangeably herein. Piston plate 38 is sealed via seal 66 to balancing plate 46 defining at least a portion of second hydraulic chamber 114. Hydraulic chamber 114 is also referred to as clutch apply chamber, lockup chamber, or apply chamber interchangeably herein. For purposes herein, 'via' is used to mean 'by way of', 'through', or 'by means of'.

Cover 12 is sealed to piston plate 38 via seal 68 defining at least a portion of third hydraulic chamber 116. Third hydraulic chamber 116 is also referred to as dynamic cancelation chamber, dynamic pressure cancelation chamber, cancelation chamber, or balancing chamber interchangeably herein. In an example aspect, hydraulic chamber 116 is sealed from hydraulic chambers 112 and 114. In an example aspect, hydraulic chamber 116 is arranged to balance the pressure from hydraulic chamber 114. To engage piston plate 38 with clutch plate 34 and cover 12, the pressure in chamber 114 is increased while chamber 116 is open to atmospheric pressure. To disengage piston plate 38, either the pressure through chamber 116 is increased and/or a spring such as leaf spring 64 is employed to disengage as is known by those skilled in the art. Chambers 114 and 116 include a sealing arrangement effective at preventing drift-on or drift-off of clutch plate 34 due to dynamic pressures during operation.

Referring to FIG. 2, in an example aspect, there are at least two fluid pathways to first hydraulic chamber 112: first fluid pathway 170 lies between hub 98 and stator 84 entering torque converter 10 between one-way clutch 30 and hub 98 fixed via weld 96 to impeller shell 16; and second fluid pathway 175 lies between stator 84 and input shaft 82 entering torque converter 10 between one-way clutch 30 and hub 80 fixed via rivet 83. Fluid pathway 180 lies within the hollow center of transmission input shaft 82 and travels between hub 80 and cover pilot portion 88 of cover hub 74 and through cover hub 74 via bore 190 into second hydraulic chamber or apply chamber 114. Fluid pathway 185 lies between hub 80 and input shaft 82 and travels through hub 80 via bore 200 and cover hub 74 via bore 195 into third hydraulic chamber or balancing chamber 116. Bores 190 and 195 are circumferentially offset and do not intersect.

FIG. 3 illustrates a close-up view of the area in circle B of FIG. 1 showing the seal arrangement for a torque converter according to an example aspect. Piston plate 38 includes inner surface 37, outer surface 39, and inner circumferential surface 35. In an example aspect, piston plate inner surface 35 is sealed via seal 66 to balancing plate 46. In an example aspect, piston plate outer surface 39 is sealed via seal 68 to cover 12.

Referring again to FIGS. 1-3, cover hub 74 includes body 71, pedestal 72 having outer circumferential surface 73, and groove 70 disposed therein. Cover hub 74 is fixed to cover 12 at weld 52 and to balancing plate 46 at weld 54. In an example aspect, seal 56, which seals piston plate 38 to cover hub 34, is positioned at third radial distance r3 relative to axis of rotation A. More particularly, piston plate inner circumferential surface 35 is sealed via seal 56, disposed in groove 70, to cover hub outer circumferential surface 73. In an example aspect, third radial distance r3 is less than first and second radial distances r1, r2. In an example aspect, torque converter 10 includes thrust washer 48 having thrust surface 47. In an example aspect, seal 56 is radially outward relative to thrust surface 47. In an example aspect, torque converter 10 includes balancing plate 46 connected in a circumferential direction via at least one leaf spring 64 and at least one rivet 60, 62 to piston plate 38.

In an example aspect, torque converter 10 comprises impeller 18, turbine 20 and stator 32 disposed within hydraulic chamber 112, and, a lockup clutch or clutch plate 34 including piston plate 38. Hydraulic chamber 112 is for being pressurized to prevent cavitation of turbine 20, stator 32, or impeller 18. Hydraulic chamber 114 is for being pressurized to engage lockup clutch 34 in apply mode. Hydraulic chamber 116 is for being de-pressurized to reduce a back pressure on lockup clutch piston plate 38. In an example aspect, lockup clutch 34 is positioned radially outward relative to the second and third hydraulic chambers 114 and 116. Advantageously, chambers 114 and 116 maintain constant radial distances r1 and r2, which are equivalent, whether or not lockup clutch is in apply mode or is disengaged.

In an example aspect, torque converter 10 comprises (i) a housing including impeller shell 16 and cover 12; (ii) first hub 74, fixed to cover 12, comprising: body 71; pedestal 72 positioned radially outward relative to body 71 and having outer circumferential surface 73 and groove 70 disposed therein; and, seal 56 disposed in groove 70; (iii) torque converter clutch 33 including: piston plate 38 rotationally sealed to first hub 74 via seal 56; and clutch plate 34; (iv) seal 66 for sealing piston plate 38 to a balancing plate 46; (v) seal 68 for sealing piston plate 38 to cover 12; (vi) balancing plate 46 rotationally fixed to piston plate 38 and fixed to first hub 74; and; (vii) turbine 20 including turbine shell 22 fixed to second hub 80 arranged for sealing to transmission input shaft 82. In an example aspect, radial distance r3 is maximized to seal piston plate 38 to cover hub 74 at a radial distance approaching that of r1 and r2.

In an example aspect, torque converter 10 further comprises axis of rotation A, wherein seal 56 is at radial distance r3 relative to axis of rotation A; seal 66 is at radial distance r1 relative to axis of rotation A; seal 68 is at radial distance r2 relative to axis of rotation A; wherein radial distance r3 is less than radial distances r1 and r2; and, wherein radial distances r1 and r2 are the same or equal. In an example aspect, clutch plate 34 is radially outward relative to balancing plate 46. Advantageously, clutch 34 is radially outward also of hydraulic chambers 114 and 116 sealed at seals 66 and 68; therefore, balancing of pressures between the two chambers is attained even in apply mode.

In an example aspect, torque converter 10 further comprises thrust washer 48 including thrust surface 47, wherein seal 56 is radially outward relative to thrust surface 47. In an example aspect, thrust surface 47 faces balancing plate 46. In an example aspect, torque converter 10 further comprises seals 76, wherein hub 80 is sealed to hub 74 via seals 76. In an example aspect, hub 80 is arranged for sealing to transmission input shaft 82. In an example aspect torque converter 10 further comprises damper 40 drivingly engaged with turbine 20 and including spring retainer 44 fixed directly to turbine shell 22 of turbine 20. In an example aspect, balancing plate 46 is connected in a circumferential direction via at least one leaf spring 64 and at least one rivet 60, 62 to piston plate 38. Rivets 60 and 62 are circumferentially offset.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:
1. A torque converter comprising:
an axis of rotation;
a first seal at a first radial distance relative to the axis of rotation;
a second seal at a second radial distance relative to the axis of rotation;
an impeller shell and a balancing plate defining at least a portion of a first hydraulic chamber;
a piston plate sealed via the first seal to the balancing plate defining at least a portion of a second hydraulic chamber;

a cover sealed to the piston plate via the second seal defining at least a portion of a third hydraulic chamber; and, the first radial distance is same or equal to the second radial distance.

2. The torque converter as in claim 1, wherein the third hydraulic chamber is sealed from the first and second hydraulic chambers.

3. The torque converter as in claim 1, wherein the third hydraulic chamber is arranged to balance the pressure from the second hydraulic chamber.

4. The torque converter as in claim 1, wherein the piston plate has an inner surface, an outer surface, and an inner circumferential surface, and wherein the piston plate inner surface is sealed via the first seal to the balancing plate and the piston plate outer surface is sealed via the second seal to the cover.

5. The torque converter as in claim 4 further comprising:
a cover hub, including a pedestal having an outer circumferential surface and a groove disposed therein, fixed to the cover and the balancing plate; and,
a third seal at a third radial distance relative to the axis of rotation.

6. The torque converter as in claim 5, wherein the piston plate inner circumferential surface is sealed via the third seal, disposed in the groove, to the cover hub outer circumferential surface.

7. The torque converter as in claim 5, wherein the third radial distance is less than the first and second radial distances.

8. The torque converter as in claim 5 further comprising a thrust washer including a thrust surface, wherein the third seal is radially outward relative to the thrust surface.

9. The torque converter as in claim 1, wherein the balancing plate is connected in a circumferential direction via at least one leaf spring and at least one rivet to the piston plate.

10. The torque converter as in claim 1 further comprising:
an impeller;
a turbine and a stator disposed within the first hydraulic chamber, and,
a lockup clutch including the piston plate, wherein:
the first hydraulic chamber is for being pressurized to prevent cavitation of the turbine, stator, or impeller;
the second hydraulic chamber is for being pressurized to engage the lockup clutch;
the third hydraulic chamber is for being de-pressurized to reduce a back pressure on the lockup clutch piston plate.

11. The torque converter as in claim 10, wherein the lockup clutch is positioned radially outward relative to the second and third hydraulic chambers.

12. A torque converter comprising:
a housing including an impeller shell and a cover;
a first hub, fixed to the cover, comprising:
a body;
a pedestal positioned radially outward relative to the body and having an outer circumferential surface and a groove disposed therein; and,
a first seal disposed in the groove;
a torque converter clutch including:
a piston plate rotationally sealed to the first hub via the first seal; and
a clutch plate;
a second seal for sealing the piston plate to a balancing plate;
a third seal for sealing the piston plate to the cover;
the balancing plate rotationally fixed to the piston plate and fixed to the first hub; and;
a turbine including a turbine shell fixed to a second hub arranged for sealing to a transmission input shaft, wherein:
the first seal is at a first radial distance relative to the axis of rotation;
the second seal is at a second radial distance relative to the axis of rotation;
the third seal is at a third radial distance relative to the axis of rotation;
wherein the first radial distance is less than the second and third radial distances; and
wherein the second and third radial distances are same or equal.

13. The torque converter as in claim 12, wherein the clutch plate is radially outward relative to the balancing plate.

14. The torque converter as in claim 12 further comprising a thrust washer including a thrust surface facing the balancing plate, wherein the first seal is radially outward relative to the thrust surface.

15. The torque converter as in claim 12 further comprising a fourth seal and a fifth seal, wherein the second hub is sealed to the first hub via the fourth and fifth seals.

16. The torque converter as in claim 12 further comprising a damper drivingly engaged with the turbine and including a spring retainer fixed to the turbine.

17. The torque converter as in claim 12, wherein the balancing plate is connected in a circumferential direction via at least one leaf spring and at least one rivet to the piston plate.

18. A torque converter comprising:
an axis of rotation;
a first fluid pathway arranged for flowing hydraulic fluid from a transmission input shaft through a first bore in a first hub to an apply chamber;
a second fluid pathway arranged for flowing hydraulic fluid from between the transmission input shaft and a second hub through a second bore in the first hub into a balancing chamber;
a third fluid pathway arranged for flowing hydraulic fluid between a third hub and a stator shaft into a fluid coupling chamber;
a fourth fluid pathway arranged for flowing hydraulic fluid between the second hub and the stator shaft into the fluid coupling chamber;
a piston plate;
a first seal at a first radial distance relative the axis of rotation for sealing the first hub to the piston plate;
a second seal at a second radial distance relative the axis of rotation for sealing the piston plate to a balancing plate;
a third seal at a third radial distance relative the axis of rotation for sealing the piston plate to the cover;
the first radial distance is at most equal to the second and third radial distances, where the second and third radial distances are same or equal.

19. The torque converter as in claim 18 further comprising a clutch plate, wherein the clutch plate is radially outward relative to the balancing plate, the apply chamber, and the balancing chamber.

* * * * *